United States Patent [19]

Gambin et al.

[11] Patent Number: 5,288,965
[45] Date of Patent: Feb. 22, 1994

[54] ELECTRO-EROSION MACHINE WITH IMPROVED CIRCUIT FOR THE UNWINDING OF THE WIRE-ELECTRODE

[76] Inventors: Rémi Gambin, "Les Colliness", 25 route de Livron, F 74100 Vetraz-Monthoux, France; Daniel Matter, 31 A, chemin des Salières, CH 1219 Aire, Switzerland

[21] Appl. No.: 893,311

[22] Filed: Jun. 3, 1992

[30] Foreign Application Priority Data

Jun. 3, 1991 [CH] Switzerland .................. 1632/91

[51] Int. Cl.⁵ .................................................. B23H 7/10
[52] U.S. Cl. ............................................... 219/69.12
[58] Field of Search .............. 219/69, 12; 204/224 M

[56] References Cited

U.S. PATENT DOCUMENTS

| 4,387,286 | 6/1983 | Inoue | 219/69.12 |
| 5,070,224 | 12/1991 | Töpfer et al. | 219/69.12 |

FOREIGN PATENT DOCUMENTS

| 62-251021 | 10/1987 | Japan | 219/69.12 |
| 233810 | 10/1977 | U.S.S.R. | 219/69.12 |
| 657948 | 4/1979 | U.S.S.R. | 219/69.12 |

Primary Examiner—Geoffrey S. Evans
Attorney, Agent, or Firm—Gifford, Groh, Sprinkle, Patmore and Anderson

[57] ABSTRACT

An electro-erosion machine including rollers for pulling the used wire electrode from the machining area and imparting a curl to it depositing it in a collection receptacle.

6 Claims, 2 Drawing Sheets

ELECTRO-EROSION MACHINE WITH IMPROVED CIRCUIT FOR THE UNWINDING OF THE WIRE-ELECTRODE

FIELD OF THE INVENTION

This invention concerns a spray machine, for electrical discharge machining with a wire-electrode, in which a dielectric liquid is injected into the machining zone from two machining heads, is collected in a tank, then recycled to these heads.

DESCRIPTION OF THE PRIOR ART

Well-known spray machines for cutting by electro-erosion using a wire-electrode most often comprise a work table on which is fixed the workpiece-electrode to be machined as well as its clamping system, the whole immersed in a work tank collecting the dielectric liquid. The wire-electrode moves between two machining heads situated on either side of the piece to be machined and moves through the machining zone, that is to say the slot cut in this workpiece. It moves forward in the latter according to the planned trajectory owing to a relative movement between the two electrodes and can also slant with respect to the vertical, through a preset angle. Each machining head has a wire guide and injects machining liquid between the wire and the workpiece in order to cool them and to flush away waste. This relative movement is obtained by moving either the workpiece, or the heads, and the inclination of the wire by shifting the heads with respect to one another. In general, these movements are carried out in two horizontal planes, on either side of the machining zone, owing to two cross-slide systems.

At the outlet from the lower machining head, the wire is carried along by appropriate means to the rear of the machine frame where a receptacle for used wire is located.

In effect, the base of the frame is traditionally occupied by a reservoir into which one empties and recycles the dielectric machining liquid. The devices comprising the wire removal system vary according to the manufacturer. Their influence on the frequency of wire breakage and on the precision and reproducibility of machining is well known, in particular for their action on the mechanical tension and slack of the wire, the constance of its running speed and the magnitude of the vibrations that can be induced in the wire. They also have a great importance for the safety of the machine, since the wire is electrically "live" as it comes out of e lower machining head.

SUMMARY OF THE PRESENT INVENTION

The object of the present invention is therefore the creation of a machine for cutting by electro-erosion not presenting any of the disadvantages inherent in the removal of the used wire and making possible machining with a highly-tensioned wire-electrode (to reduce its slack and increase the precision and speed of machining, etc. . . )

Therefore, a spray-operating machine according to the present invention for cutting by electro-erosion a stationary workpiece with a wire-electrode, has:

a frame with a stand made of vertical elements arranged in such a way as to delimit an open space towards the machining zone, the workpiece to be machined and its clamping system being mounted above this space, on pillars fixed directly to said elements of the stands, without the intermediary of a work a lower machining head equipped with two rotary rollers fitted to pinch and pull the wire and with two small toothed wheels between which the wire passes and which are arranged to make the wire curl at the exit from the two rollers, the used wire, at the exit from this lower machining head, penetrating directly into the space delimited by the elements of the stand and acting as a collector or receptacle.

It is machine actually without either machining tank or any work table.

The wire is thus removed under the machining zone and it is no longer necessary to provide a belt or compressed fluid system to transport it to the rear of the machine. There is thus no risk of slipping belts nor major wear in the case where the wire is highly tensioned.

Furthermore, a tank intended to collect the dielectric machining liquid as well as, as the case may be, the scrap cut from the workpiece being machined, can be located in the bottom of or around the base of the stand; it thus acts as a "dirty" or "contaminated" tank.

In the case where the wire is not cut at the outlet from the machining zone, the length of used wire cools down in contact with the liquid and this cooling is transmitted to the section moving through the machining zone, thus reducing the risk of wire breakage.

Another advantage is that the entire area between the surface of the fastening pillars and the upper machining head may be taken up by the workpiece. There is no lateral obstacle on three sides; the displacements of the machining heads are no more impeded by the walls of a work tank. The upper arm is movable along an Y axis and is thus able to bring the upper heads near against the croobeam. Thus the clamping operations for the workpiece are highly facilited and, for a machine of a given size, one can machine pieces which are considerably taller, wider and longer (and heavier) than with known machines of a similar size.

According to this invention, one thus has a structure that is more rigid and is less cluttered.

This type of removal circuit for electrode wire can be used advantageously on rigid, terminal stable machines, with or without a chamber, as is known in the art.

Below, the invention is illustrated in greater detail with the help of drawings representing only one of the advantageous embodiments as a simple open-ended example. Any modification to the shape or points of detail may be made to the said machine without compromising the spirit of the invention.

BRIEF DESCRIPTION OF THE DRAWING

The same reference numbers are used in both figures to identify identical parts.

Figure 1:
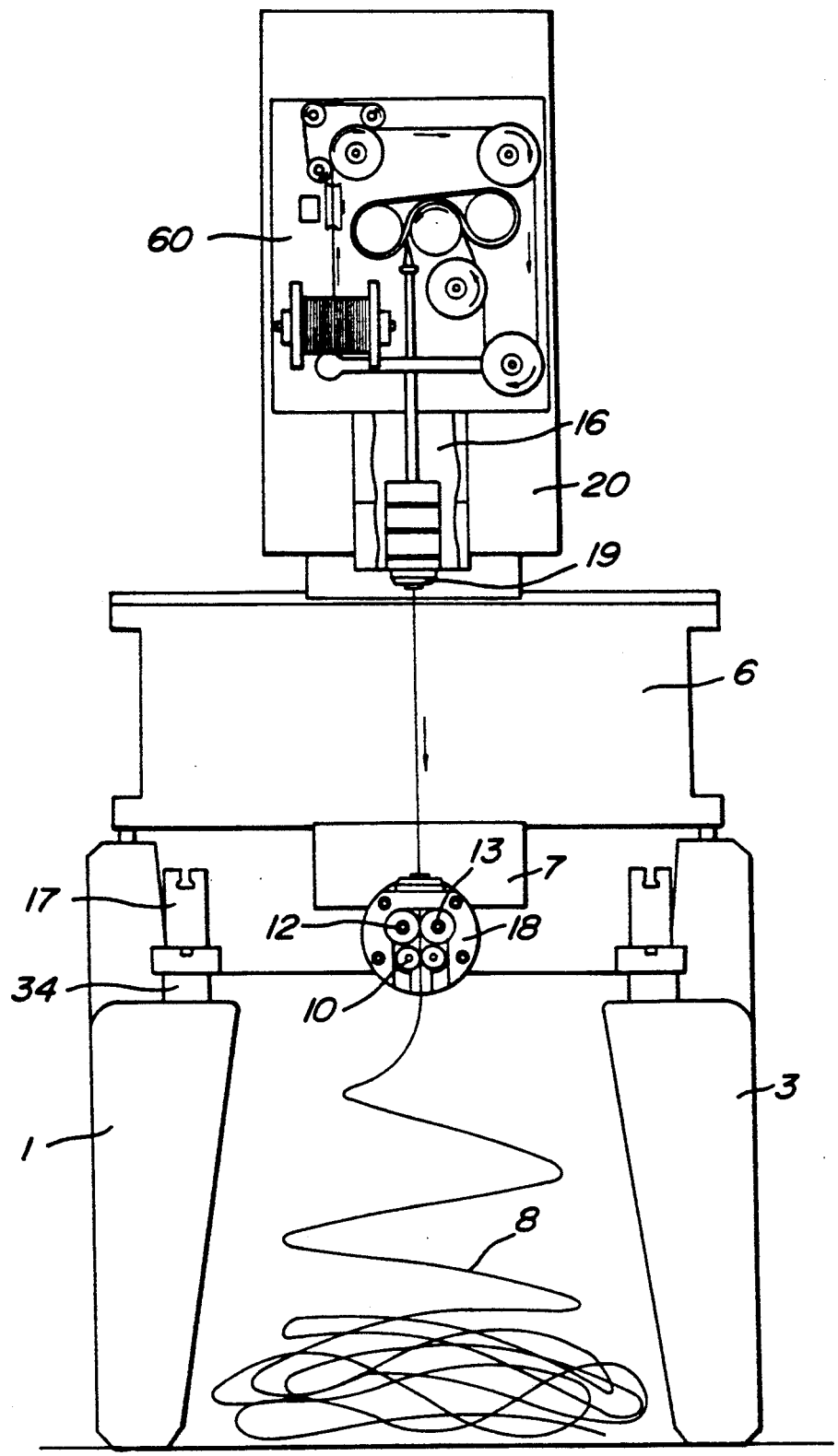
FIG. 1 is a simplified view of the frontal part and of one of the sides of the machine main frame of the said invention.

The frame of the machine according to this invention represented in the drawing has been described in detail in the Swiss patent application 1622/91.

DESCRIPTION OF THE PREFERRED EMBODIMENT OF THE PRESENT INVENTION

The stand is made of Rhenocast (R) (a trademark designating a polymerized concrete of the company, George Fischer). This unalterable material which is unalterable and rustproof and also acts as a thermic and electrical insulator, is most suitable for this use, because the base is intended to be in contact with the used dielectric fluid and the electrically charged electrode wire which comes out of the lower machining head 18. Its density is only a third of the steel for a comparable thermic expansion coefficient, 1-2 μm/degree/mn. This base could, however, be manufactured from any other known material for this use: cast iron, brazen steel, hydraulic concrete, ceramic, etc.

The saddle slide carriage 15 is prolonged by the upper arm (not visible in FIG. 1) and carries a vertical part 16 which contains a device 20 of a known kind, only the covering of which is visible in FIG. 1. The former activates the upper machining head 19 to slide along a rack arranged along the axis Z. This vertical part also supports the various wire-electrode supply mechanisms (plate 60).

The crossbeam 6 and the carriages 7, 8, 14 and 15 are made of cast iron. They could however be made of any other known material for this purpose: soldered steel, cast iron, ceramic, etc.

Two granite pillars 17 and 21 are, with the said of six elements 34, secured on the upper surface of the sides 1 and 3, which are positioned below the shoulders 4 and 5. They are fitted with a rail suitable for supporting the clamping system components of a known type; shown here are the grooved rails 35 and 36 of a CT1000 SYSTEM.

A transparent and movable protective wall, 49 closes up laterally the area 50 set between the bottom of vat 45 and the machining head 18, where the used wire piles up.

Thus the machining heads 18 and 19 may adopt any position in relation to the work piece, each independently of the other. It is, possible to slant the wire of more than 30° in a relative workpiece to head that such has a height of 400 mm. The transverse movement lower machining head relative to the upper machining heads assists in the slanting of the wire.

Figure 2:
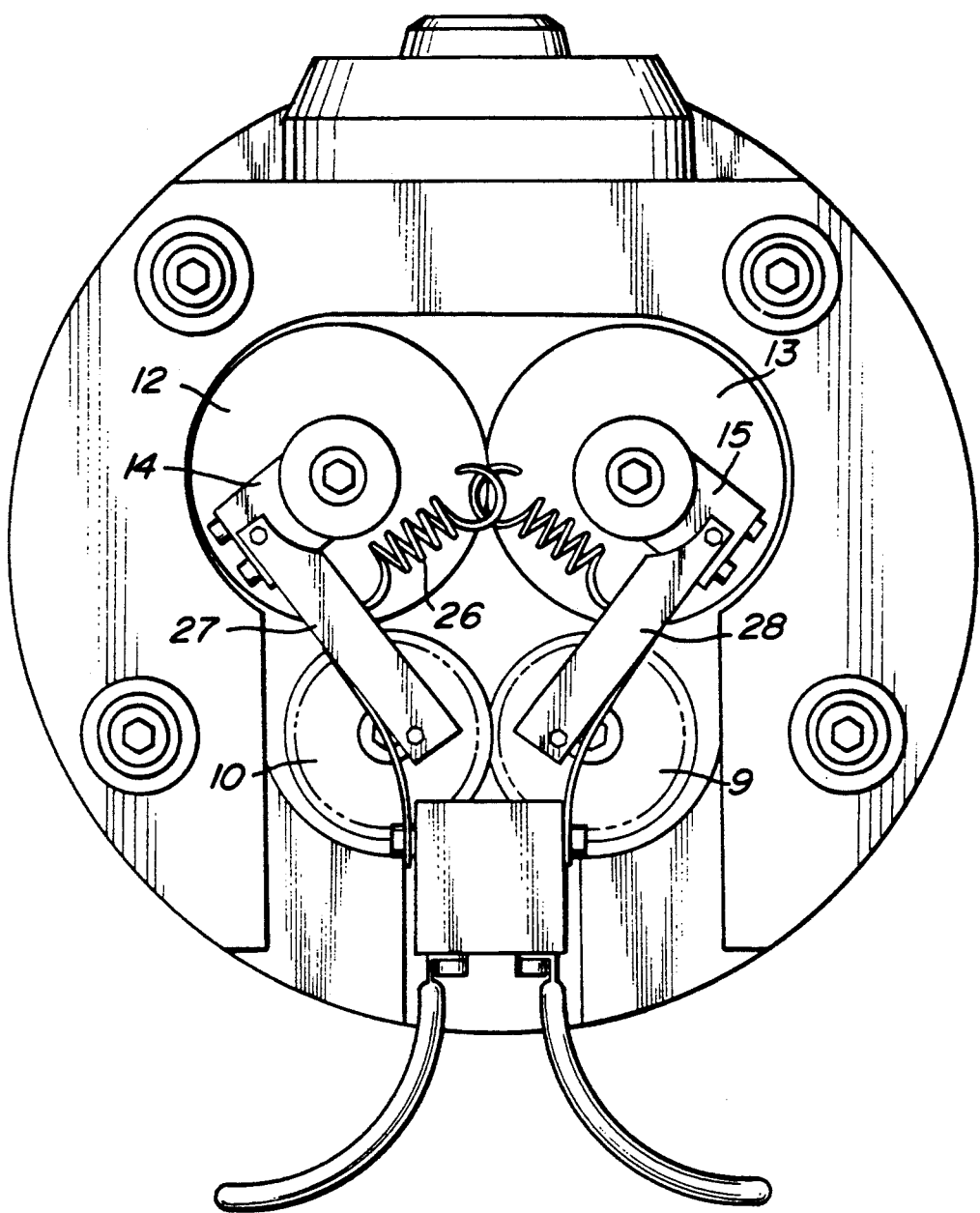
FIG. 2 shows certain devices of a lower head for a machine according to the present invention.

A motor (not visible in FIG. 2) drives the two rollers 12 and 13 intended to pinch and pull the wire 8. Their pressure on the wire 8 is adjustable as a function of the diameter of the wire 8 owing to a spring system of known type (not visible in FIG. 2); the tension of this spring can be varied by adjusting a screw.

The unwinding speed of the wire is precisely programmable, in a known manner.

The two devices 12 and 13 act both as wire guide and as contacts bringing the electric current to the wire 8. Current is transmitted to them via two brushes 14 and 15 pressing on their axis of rotation thanks to the two spring-loaded levers 27 and 28 (springs 26). These latter also contribute to good contact between the rollers 12 and 13 and the wire 8.

The two small toothed wheels 9 and 10 are intended to make the wire curl as described in patent CH 636 136. However their central section presents a concavity which allows the wire- electrode to slide between them with some lateral play. Thus, when the speed of the wire is too high in relation their speed of rotation, it slips laterally and rides up onto one of the edges of this curve. In the opposite case, it runs in the middle. This concavity therefore allows autoregulation of the running speed of the wire. This is very advantageous, since it is no longer necessary to precisely synchronise the speed of rotation of these little wheels 9 and 10 with the speed of the wire at the exit from the rollers 12 and 13. One thus advantageously avoids having for example to dismantle the pulley(s) driving the little wheels and reassembling wheels of a different diameter, the diameter of these latter having to be to the speed of rotation.

I claim

1. An apparatus for tensioning a wire electrode of a spray-operating machine and for removing the used electrode wire from a machining zone of the machine, said machine cutting by electro-erosion a stationary workpiece, said apparatus comprising:

said machine including a frame with a stand made of vertical elements arranged in such a way as to delimit an open space beneath the machining zone, the workpiece to be machined and its clamping system being mounted above said open space on pillars fixed directly to said vertical elements of said stand without the intermediary of a work tank, the electrode wire being supplied to the machining zone from an upper machining head, a lower machining head equipped with two rotary rollers which are fitted to pinch and pull the electrode wire so as to tension the electrode wire in the machining zone, and two toothed wheels mounted to said lower machining head beneath said rotary rollers, said used electrode wire passes between said rotary rollers and said toothed wheels, said toothed wheels imparting a curl to the wire electrode at the exit from the two rollers, the used wire, at the exit from said lower machining head, becoming coiled and falling directly into a receptacle in said open space delimited by the elements of the stand beneath the machining zone.

2. The apparatus according to claim 1, in which a central section of the two small wheels has a concavity fitted to autoregulate the unwinding of the wire between them by allowing the wire to slide laterally in relation to its running direction when its speed at the exit from the rollers is not precisely synchronized with the speed of rotation of the toothed wheels.

3. The apparatus according to claim 1, in which the pressure of the rollers on the electrode wire is adjustable as a function of the diameter of the wire.

4. The apparatus according to claim 1, in which the speed of rotation of the rollers is programmable and precisely slaved.

5. The apparatus according to claim 1, in which the rollers are fitted to act as a wire guide.

6. The apparatus according to claim 1, in which the rollers are arranged to act as contacts feeding the electrode wire with electric current in order to machine the workpiece.

* * * * *

UNITED STATES PATENT AND TRADEMARK OFFICE
CERTIFICATE OF CORRECTION

PATENT NO.   : 5,288,965
DATED        : February 22, 1994
INVENTOR(S)  : Remi Gambin and Daniel Matter It is certified that error appears in the above-indentified patent and that said Letters Patent is hereby corrected as shown below:

Column 1, line 51, delete "e" and insert --the--.

Column 2, line 2, after "work" insert --tank and--.

Column 2, line 44, delete "terminal" and insert --thermally--.

Column 3, line 7, delete "the" and insert --that of--.

Column 3, line 24, delete "said" and insert --aid--.

Column 3, line 37, delete "of".

Column 3, line 38, delete "in a" and insert --to the--; delete "to head that"; and after "such" insert --that it--.

UNITED STATES PATENT AND TRADEMARK OFFICE
CERTIFICATE OF CORRECTION

PATENT NO. : 5,288,965  
DATED : February 22, 1994  
INVENTOR(S) : Remi Gambin, et al Page 2 of 2

It is certified that error appears in the above-indentified patent and that said Letters Patent is hereby corrected as shown below:

Column 3, line 40, before "lower" insert --of the--.

Signed and Sealed this

Sixth Day of December, 1994

Attest:

BRUCE LEHMAN

Attesting Officer

Commissioner of Patents and Trademarks